United States Patent [19]

Oriani

[11] Patent Number: 5,627,254
[45] Date of Patent: May 6, 1997

[54] RIGID THERMOPLASTIC PLYURETHANE COMPRISING UNITS OF BUTANE DIOL AND A POLYETHYLENE GLYCOL

[75] Inventor: Steven R. Oriani, Houston, Tex.

[73] Assignee: The Dow Chemical Company, Midland, Mich.

[21] Appl. No.: 642,744

[22] Filed: May 3, 1996

[51] Int. Cl.$^6$ .................................................. C08G 18/32
[52] U.S. Cl. .................................................. 528/76
[58] Field of Search ........................................ 528/78

[56] References Cited

U.S. PATENT DOCUMENTS

| | | |
|---|---|---|
| Re. 31,671 | 9/1984 | Bonk et al. ........................ 521/170 |
| 3,642,964 | 2/1972 | Rausch, Jr. et al. .................. 264/49 |
| 4,376,834 | 3/1983 | Goldwasser et al. . |
| 4,385,133 | 5/1983 | Alberino et al. . |
| 4,522,975 | 6/1985 | O'Connor et al. . |
| 4,822,827 | 4/1989 | Bonk ................................. 528/76 |
| 5,167,899 | 12/1992 | Jezic . |

*Primary Examiner*—Morton Foelak
*Attorney, Agent, or Firm*—Reid S. Willis

[57] ABSTRACT

The present invention is a rigid thermoplastic polyurethane (RTPU) comprising units of butane diol (BDO) and a polyethylene glycol (PEG) of the type HO—$(CH_2CH_2O)_n$—H, where n is an integer from 2 to 6. The RTPU of the present invention addresses a problem in the art by providing a potentially lower-cost alternative to an RTPU prepared from hexane diol, and further providing an RTPU that can be customized to a desired toughness, $T_g$, yield strength, and transparency. The RTPUs that are prepared from certain mole ratios of BDO and the PEG exhibit a surprisingly high degree of toughness manifested by increased tensile elongation to break.

19 Claims, 3 Drawing Sheets

Tensile Elongation to Break of E-300/BDO/MDI RTPUs

RIGID THERMOPLASTIC PLYURETHANE COMPRISING UNITS OF BUTANE DIOL AND A POLYETHYLENE GLYCOL

BACKGROUND OF THE INVENTION

Rigid thermoplastic polyurethanes (RTPUs) are single- or two-phase polymers that can be prepared by the reaction of approximately stoichiometric amounts of: a) a diisocyanate with b) a diol, which comprises a low molecular weight diol (molecular weight of not more than 300) and a high molecular weight diol (molecular weight generally in the range of from about 500 to about 8000). These RTPUs have a glass transition temperature ($T_g$) of not less than 50° C. and typically have a hard segment content of not less than 75 percent. The disclosure and preparation of RTPUs is described, for example, by Goldwasser et al. in U.S. Pat. No. 4,376,834, the teachings of which preparation are incorporated herein by reference.

In some instances, it is desirable to prepare optically transparent RTPUs, that is, amorphous RTPUs having a single $T_g$. These optically transparent RTPUs, which are usually prepared using hexane diol as the low molecular weight diol, are useful in a variety of applications that require toughness, chemical resistance, and dimensional stability. Examples of useful products made from optically transparent RTPUs include toothbrush handles, water or fuel filtration components, windows, and connectors for intravenous delivery systems.

Although hexane diol is an effective monomer for the preparation of optically transparent RTPUs, it may be desirable to use alternative monomers which allow greater flexibility in customizing physical properties of the RTPU such as $T_g$ and yield strength. It would be further desirable if such alternative monomers provided lower-cost RTPUs.

SUMMARY OF THE INVENTION

The present invention is a rigid thermoplastic polyurethane comprising: a) units of a diisocyanate; b) units of a polyethylene glycol having the structure HO—(CH$_2$CH$_2$O)$_n$—H, where n is an integer from 2 to 6: c) units of butane diol; and d) not more than 25 weight percent of units of a high molecular weight diol based on the total weight of the rigid thermoplastic polyurethane, the rigid thermoplastic polyurethane being further characterized by having a $T_g$ of at least 50° C., with the proviso that when the polyethylene glycol is the units of the triethylene glycol to the units of the butane diol is from 25:75 to 90:10; b) the rigid thermoplastic polyurethane comprises not more than 1.9 weight percent of units of the high molecular weight diol; or c) the thermoplastic polyurethane is optically transparent.

In another aspect, the present invention is a rigid thermoplastic polyurethane comprising: a) units of a diisocyanate: b) units of triethylene glycol; c) units of butane diol; and d) not more than 1.9 weight percent of units of a high molecular weight diol based on the total weight of the rigid thermoplastic polyurethane, the rigid thermoplastic polyurethane being further characterized by having a $T_g$ of at least 50° C.

In yet another aspect, the present invention is a rigid thermoplastic polyurethane comprising: a) units of a diisocyanate; b) units of diethylene glycol; c) units of butane diol; and d) not more than about 25 weight percent of units of a high molecular weight diol based on the total weight of the rigid thermoplastic polyurethane, the rigid thermoplastic polyurethane being further characterized by having a $T_g$ of at least 50° C.

The present invention addresses a problem in the art by providing a potentially lower-cost alternative to an RTPU prepared from hexane diol, and further providing an RTPU that can be customized to a desired toughness, $T_g$, yield strength, and transparency. It has been discovered that such an RTPU can be prepared from the reaction of a diisocyanate with BDO and polyethylene glycol (PEG). The RTPU that is prepared from certain mole ratios of BDO and the PEG exhibit a surprisingly high degree of toughness manifested by increased tensile elongation to break.

DEFINITION OF TERMS

Figure 1:
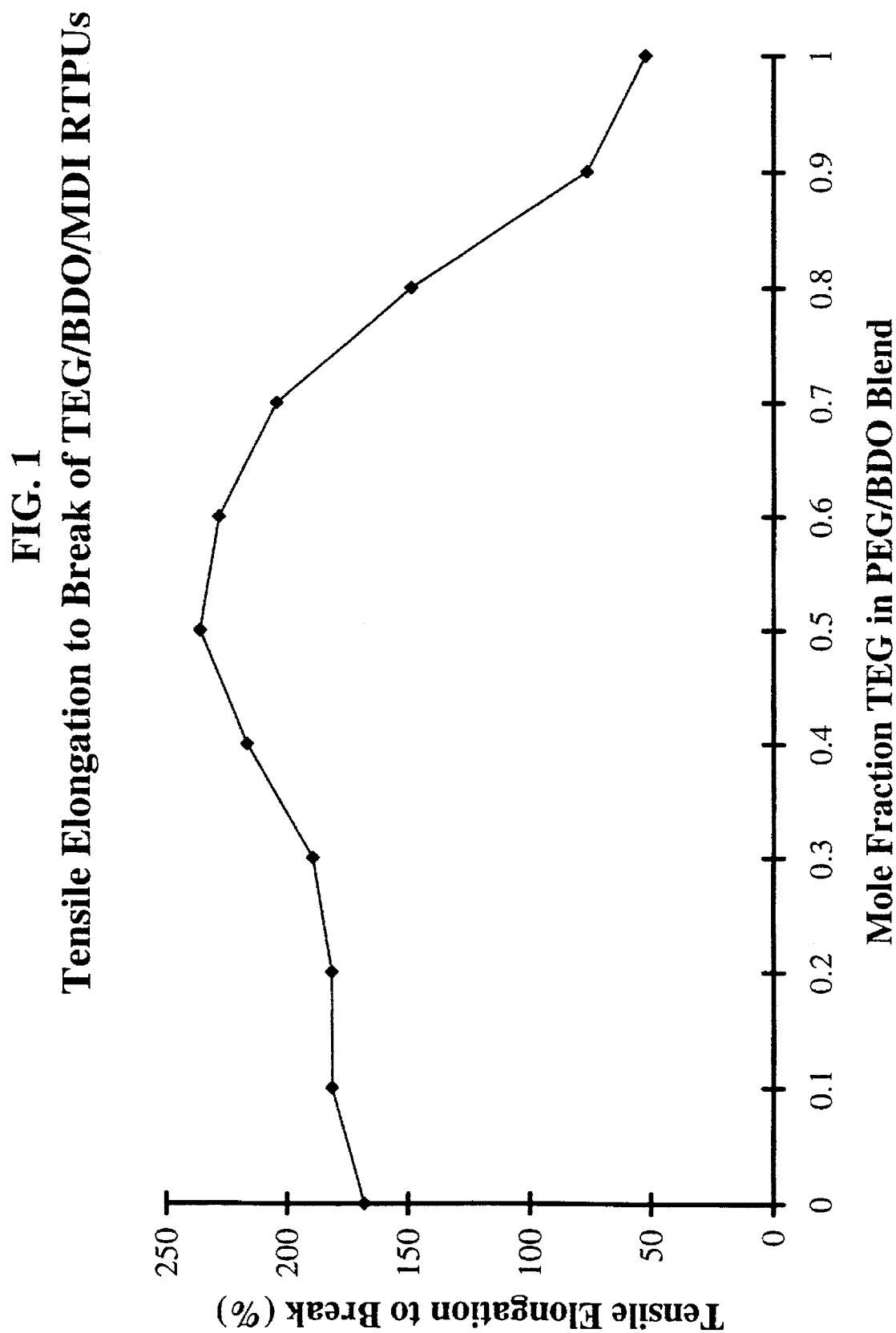
FIG. 1 is a graph of the tensile elongation to break of an RTPU versus the ratio of TEG to BDO used to prepare the RTPU.
Figure 2:
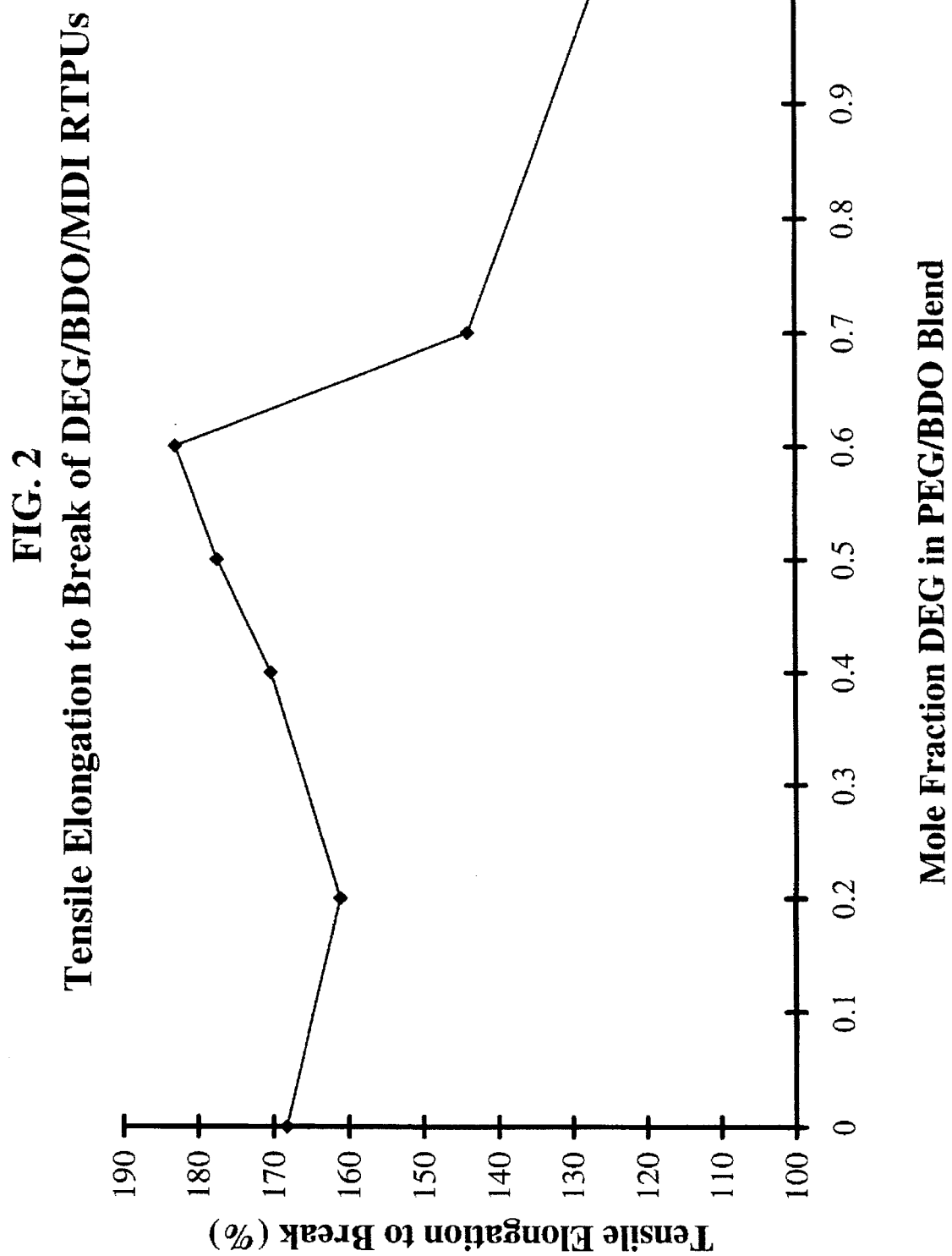
FIG. 2 is a graph of tensile elongation to break of an RTPU versus the ratio of DEG to BDO used to prepare the RTPU.
Figure 3:
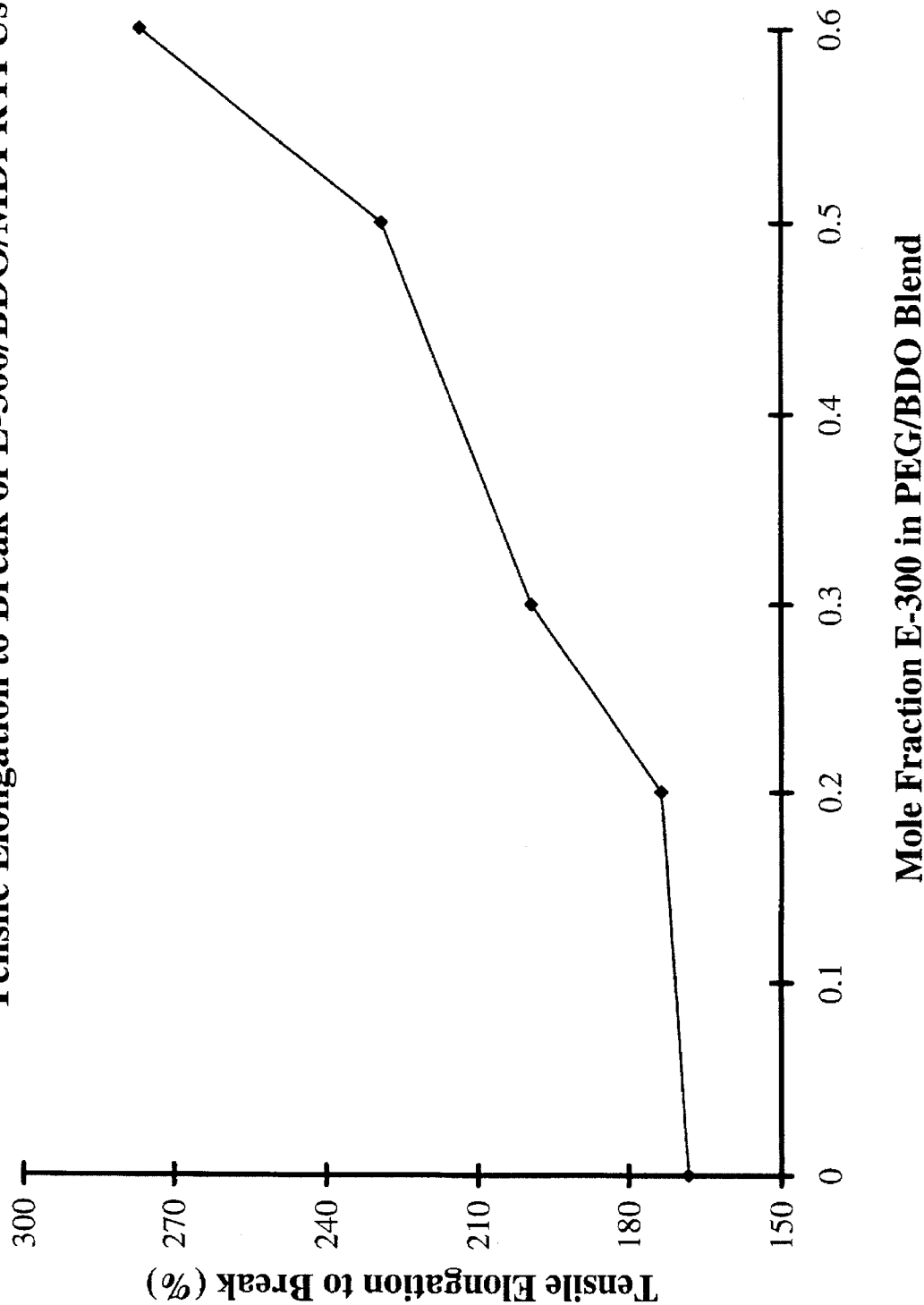
FIG. 3 is a graph of tensile elongation to break of an RTPU versus the ratio of E-300 to BDO used to prepare the RTPU.

The term "mixture of a PEG and BDO" refers to a blend of the polyethylene glycol and butane diol, which, when reacted with a diisocyanate, forms a polymer that comprises a backbone having units of the PEG and the BDO.

The term "units of" is used herein to refer to a repeating sequence of a molecular fragment within the RTPU. For example, the term "units of butane diol" is used herein to refer to the following repeating sequence within the RTPU:

Similarly, the term "units of triethylene glycol" is used herein to refer to the following repeating sequence within the RTPU:

The term "units of a diisocyanate" is used herein to refer to the following repeating sequence within the RTPU:

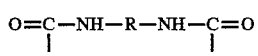

wherein R is an aromatic, aliphatic, or cycloaliphatic group.

The term "butane diol" is used herein to refer to 1,4-butane diol.

DETAILED DESCRIPTION OF THE INVENTION

The RTPU of the present invention can be prepared by the reaction of a diisocyanate with a PEG and BDO. Preferably, the PEG is TEG or DEG, more preferably TEG. When the PEG is TEG, the preferred mole-to-mole ratio of units of TEG to units of BDO in the RTPU is from about 25:75. more preferably from 35:65, and most preferably from 45:55, to about 90:10, more preferably to about 75:25. and most preferably to about 60:40.

When the PEG is DEG, the preferred mole-to-mole ratio of DEG to BDO is from about 25:75 more preferably from about 40:60, and most preferably from about 50:50, to about 70:30, more preferably to about 65:35, and most preferably to about 60:40.

When the PEG is hexaethylene glycol (E-300), the preferred mole-to-mole ratio of E-300 to BDO is from about 30:70 to about 60:40. At ratios somewhat higher than about 60:40 E-300 to BDO, the $T_g$ of the TPU drops to less than 50° C.

Preferred diisocyanates include aromatic, aliphatic, and cycloaliphatic diisocyanates and combinations thereof. Representative examples of these preferred diisocyanates can be found in U.S. Pat. Nos. 4,385,133; 4,522,975; and 5,167,899, the disclosure of which diisocyanates are incorporated herein by reference. Preferred diisocyanates include 4,4'-diisocyanatodiphenylmethane, p-phenylene diisocyanate, 1,3-bis(isocyanatomethyl)cyclohexane, 1,4-diisocyanatocyclohexane, hexamethylene diisocyanate, 1,5-naphthalene diisocyanate, 3,3'-dimethyl-4,4'-biphenyl diisocyanate, 4,4'-diisocyanatodicyclohexylmethane, and 2,4-toluene diisocyanate, or mixtures thereof. More preferred are 4,4'-diisocyanato-dicyclohexylmethane and 4,4'-diisocyanatodiphenylmethane. Most preferred is 4,4'-diisocyanatodiphenylmethane.

The RTPU may optionally contain not more than 25 weight percent of units of a high molecular weight diol based on the total weight of the rigid thermoplastic polyurethane. The term "high molecular weight diol" is used herein to refer to a diol having a molecular weight of not less than 500 amu. Preferred high molecular weight diols are polyester and polyether glycols.

Preferably, the molecular weight of the high molecular weight diol is not less than about 600 and not more than about 8000 amu. Units of the high molecular weight diol constitute a sufficiently low fraction of the RTPU such that the $T_g$ of the RTPU is at least 50° C. Preferably, the high molecular weight diol units constitute from not more than about 10, more preferably not more than about 5, still more preferably not more than about 1.9, still more preferably not more than about 1.5, and most preferably not more than from 1 weight percent of the RTPU, to about 0 weight percent of the RTPU.

An optically transparent RTPU can be prepared by excluding high molecular weight diols from the RTPU, or by including a high molecular weight diol or a combination of high molecular weight diols that forms a single phase with the units of BDO and PEG in the RTPU, provided that the concentration of units of the high molecular weight diol or diols is sufficiently low to maintain a $T_g$ of not less than 50° C.

Examples of high molecular weight diols that can be used to form optically clear RTPUs include polyether glycols, such as polypropylene glycol, polyethylene glycol, and polytetramethylene glycol; and polyester glycols, such as polycaprolactone glycol, as well as compounds that can be prepared from the condensation reaction of an aliphatic diacid, diester, or di(acid chloride) with a $C_2-C_8$ linear, branched, or cyclic diol, or ether containing diol, or blends thereof. More preferred high molecular weight polyester glycols useful for forming optically transparent RTPUs include polycaprolactone glycol, polyethylene adipate glycol, and polybutylene adipate glycol.

The preferred molecular weight range of the high molecular weight polyether glycol is from about 600 to about 1000 amu. The preferred molecular weight range of the high molecular weight polyester glycol is from not less than about 600, more preferably not less than about 800, and most preferably not less than about 1000, to not greater than about 2000, more preferably not greater than about 1800, and most preferably not greater than about 1600 amu.

The isocyanate-to-OH ratio of the reactants varies from about 0.95:1, preferably from about 0.975:1, and more preferably from about 0.985:1, to about 1.05:1, preferably to about 1.025:1. and more preferably to about 1.015:1.

The RTPU of the present invention is advantageously prepared in the presence of a suitable catalyst such as those disclosed in U.S. Pat. No. Re. 37,671, column 5, line 46 to column 6, line 5, which disclosure is incorporated herein by reference. Preferred catalysts include stannous octoate, stannous oleate, dibutyltin dioctoate, and dibutyltin dilaurate. The amount of catalyst used is sufficient to increase the reactivity of an isocyanate group with an OH group without undesirably affecting the properties of the final product, and is preferably in the range of about 0.02 to about 2.0 weight percent based on the total weight of the reactants.

The RTPUs of the present invention can be suitably prepared by batch or continuous processes such as those known in the art. A preferred continuous mixing process is reactive extrusion, such as the twin screw extrusion process disclosed in U.S. Pat. No. 3,642,964, the description of which process is incorporated herein by reference.

Optically transparent RTPUs can be prepared from the materials described herein. These materials may be processed, for example, by extrusion or injection molding, to form toughened amorphous transparent articles such as toothbrush handles, water or fuel filtration components, windows, and connectors for intravenous delivery systems.

The present invention may be suitably practiced in the absence of any materials not specifically disclosed herein.

The following example is for illustrative purposes only and is not intended to limit the scope of this invention.

EXAMPLE 1

Preparation of Optically Clear RTPUs using TEG and BDO

TEG (obtained from The Dow Chemical Company) and BDO (obtained from E. I. DuPont de Nemours & Co., Inc.) are charged into two separate 1000-L vessels. Both reagents are stripped under vacuum of 100 kPa at 105° C. for four hours to reduce the moisture content to less than 150 ppm. After the stripping is complete, the vessels are padded with dry nitrogen. MDI (4,4'-diisocyanatodiphenylmethane, greater than 98 percent para-para) is stored under a nitrogen pad in a vessel maintained at 63° C. The exact quantities of reagents charged into the vessels are not critical so long as a sufficient amount of each reagent is available for the appropriate experiment.

The TEG, BDO, and MDI, along with FOMREZ™ UL-22 catalyst (trademark of Witco Corporation) and Irganox™ 1010 stabilizer (trademark of Ciba-Geigy Corporation) are metered into the feed port of a Werner & Pfleiderer ZSK twin screw extruder fitted with intermeshing, self-wiping screws. Feed rates of TEG, BDO, and MDI are controlled such that the molar ratio of NCO groups to OH groups is in the range of 1.0075 to 1.0125. The rotational speed of the extruder screws is kept constant for the entire run. The following table shows the feed rates of the reagents, catalyst and stabilizer for the various mole ratios of BDO and TEG. Approximately 40 kg of materials are prepared in each run.

| Reagent Molar Equivalents | | | Feed Rates (kg/hr) | | | | |
| --- | --- | --- | --- | --- | --- | --- | --- |
| BDO | TEG | MDI | BDO | TEG | MDI | Irg 1010 | UL-22 |
| 0 | 1 | 1.01 | 0 | 68.04 | 113.22 | 0.45 | 0.11 |
| 0.1 | 0.9 | 1.01 | 4.10 | 62.18 | 114.98 | 0.45 | 0.11 |

-continued

| Reagent Molar Equivalents | | | Feed Rates (kg/hr) | | | | |
|---|---|---|---|---|---|---|---|
| BDO | TEG | MDI | BDO | TEG | MDI | Irg 1010 | UL-22 |
| 0.2 | 0.8 | 1.01 | 8.32 | 56.14 | 116.79 | 0.45 | 0.11 |
| 0.3 | 0.7 | 1.01 | 12.69 | 49.91 | 118.66 | 0.45 | 0.11 |
| 0.4 | 0.6 | 1.01 | 17.19 | 43.48 | 120.59 | 0.45 | 0.11 |
| 0.5 | 0.5 | 1.01 | 21.84 | 36.83 | 122.58 | 0.45 | 0.11 |
| 0.6 | 0.4 | 1.01 | 26.65 | 29.96 | 124.65 | 0.45 | 0.11 |
| 0.7 | 0.3 | 1.01 | 31.62 | 22.85 | 126.78 | 0.45 | 0.11 |
| 0.8 | 0.2 | 1.01 | 36.77 | 15.50 | 128.98 | 0.45 | 0.11 |
| 0.9 | 0.1 | 1.01 | 42.10 | 7.89 | 131.27 | 0.45 | 0.11 |
| 1 | 0 | 1.01 | 47.62 | 0.00 | 133.64 | 0.45 | 0.11 |

Slight adjustments are made to barrel and die temperatures over the course of the run in order to optimize web handling and control pressure distribution within the extruder. Temperature set points are in the range or 200° to 235° C.

The RTPUs exit the extruder through a die which lays a 15-cm ×0.3-cm web onto a chilled, polytetrafluoroethylene-coated metal belt. After one to two minutes of cooling, the web is diced, and the resulting pellets are packaged in moisture-barrier, metal foil-lined bags.

The RTPU pellets are placed in the hopper of a dehumidifying dryer in which heated air with a dew point of approximately −34° C. is passed over the pellets. The pellets are dried for 12 hours, then transferred to the hopper of an Arburg 221 E/150 injection molding machine to produce type I tensile bars in accordance with ASTM D638. The hopper of the molding machine is blanketed with dry nitrogen to prevent moisture absorption of the RTPUs during molding. Barrel temperatures are set so that each RTPU fills the mold completely using a packing pressure in the range of 4800 to 5500 kPa. The injection speed is slow, less than 40% of the machine's capacity (knob setting of 2 or less). The collected tensile specimens are visibly free of contamination, splay, flow lines, and are optically transparent. These specimens have single glass transition temperatures in the range of 80° C. (100% TEG) to 118° C. (100% BDO), as determined by a Mettler model 30 differential scanning calorimeter operating in a heating mode at a rate of 20° C./min.

After a 24-hour conditioning period at 23° C. and 50 percent relative humidity, ten tensile specimens of each RTPU are pulled at 5 cm/min cross-head speed using an Instron 1120. The initial grip displacement is 11.4 cm and elongation to break is determined using extensometers on the 5-cm gauge length of the specimen. FIG. 1 is a depiction of tensile elongation to break (determined in accordance with ASTM D-638) versus mole traction of TEG in the TEGDO blend. The RTPUs prepared by the process described are optically transparent, that is, they have a single glass transition temperature.

What is claimed is:

1. A rigid thermoplastic polyurethane comprising: a) units of a diisocyanate; b) units of a polyethylene glycol having the structure HO—$(CH_2CH_2O)_n$—H, where n is an integer from 2 to 6; c) units of butane diol; and d) not more than 25 weight percent of units of a high molecular weight diol based on the total weight of the rigid thermoplastic polyurethane, the rigid thermoplastic polyurethane being further characterized by having a $T_g$ of at least 50° C., with the proviso that when the polyethylene glycol is triethylene glycol, at least one of the following limitations apply: a) the mole-to-mole ratio of the units of the triethylene glycol to the units of the butane diol is from 25:75 to 90:10: b) the rigid thermoplastic polyurethane comprises not more than 1.9 weight percent of units of the high molecular weight diol; or c) the thermoplastic polyurethane is optically transparent.

2. The rigid thermoplastic polyurethane of claim 1 wherein the polyethylene glycol comprises triethylene glycol, and the ratio of the units of triethylene glycol to the units of butane diol is from about 35:65 to about 75:25.

3. The rigid thermoplastic polyurethane of claim 1 wherein the polyethylene glycol comprises diethylene glycol, and the mole-to-mole ratio of the units of diethylene glycol to the units of butane diol is from 25:75 to about 65:35.

4. The rigid thermoplastic polyurethane of claim 1 wherein the polyethylene glycol comprises hexaethylene glycol, wherein the mole-to-mole ratio of the units of the hexaethylene glycol to the units of the butane diol is from about 25:75 to about 60:40.

5. The rigid thermoplastic polyurethane of claim 1, wherein the thermoplastic polyurethane is optically transparent.

6. The rigid thermoplastic polyurethane of claim 1 which comprises not more than 1.9 weight percent of units of the high molecular weight diol.

7. The rigid thermoplastic polyurethane of claim 6 which comprises about 0 weight percent of units of the high molecular weight diol.

8. The rigid thermoplastic polyurethane of claim 1 wherein the units of the high molecular weight diol comprise units of a polyethylene adipate glycol or polybutylene adipate glycol having a molecular weight in the range of about 600 to about 1800 amu, or units of a polyether glycol having a molecular weight in the range of about 600 to about 1000 amu.

9. The rigid thermoplastic polyurethane of claim 1 wherein the diisocyanate comprises 4,4'-diisocyanatodiphenylmethane, p-phenylene diisocyanate, 1,3-bis(isocyanatomethyl)-cyclohexane, 1,4-diisocyanatocyclohexane, hexamethylene diisocyanate, 1,5-naphthalene diisocyanate, 3,3'-dimethyl-4,4'-biphenyl diisocyanate, 4,4'-diisocyanatodicyclohexylmethane or 2,4-toluene diisocyanate, or mixtures thereof.

10. The rigid thermoplastic polyurethane of claim 9 wherein the diisocyanate comprises 4,4'-diisocyanatodiphenylmethane.

11. A rigid thermoplastic polyurethane comprising: a) units of a diisocyanate; b) units of triethylene glycol; c) units of butane did; and d) not more than 1.9 weight percent of units of a high molecular weight diol based on the total weight of the rigid thermoplastic polyurethane, the rigid thermoplastic polyurethane being further characterized by having a $T_g$ of at least 50° C.

12. The rigid thermoplastic polyurethane of claim 11 which comprises about 0 weight percent of units of the high molecular weight diol.

13. The rigid thermoplastic polyurethane of claim 12 wherein the diisocyanate comprises 4,4'-diisocyanatodiphenylmethane, p-phenylene diisocyanate, 1,3-bis(isocyanatomethyl)-cyclohexane, 1,4-diisocyanatocyclohexane, hexamethylene diisocyanate, 1,5-naphthalene diisocyanate, 3,3'-dimethyl-4,4'-biphenyl diisocyanate, 4,4'-diisocyanatodicyclohexylmethane, or 2,4-toluene diisocyanate, or mixtures thereof.

14. The rigid thermoplastic polyurethane of claim 13 wherein the diisocyanate comprises 4,4'-diisocyanatodiphenylmethane.

15. A rigid thermoplastic polyurethane comprising: a) units of a diisocyanate; b) units of diethylene glycol; c) units of butane diol; and d) not more than 25 weight percent of units of a high molecular weight diol based on the total weight of the rigid thermoplastic polyurethane, the rigid thermoplastic polyurethane being further characterized by having a $T_g$ of at least 50° C.

16. The rigid thermoplastic polyurethane of claim 15 which comprises not more than about 1.9 weight percent of units of the high molecular weight diol.

17. The rigid thermoplastic polyurethane of claim 16 which comprises about 0 weight percent of units of the high molecular weight diol.

18. The rigid thermoplastic polyurethane of claim 17 wherein the diisocyanate comprises 4,4'-diisocyanatodiphenylmethane, p-phenylene diisocyanate, 1,3-bis(isocyanatomethyl)-cyclohexane, 1,4-diisocyanatocyclohexane, hexamethylene diisocyanate, 1,5-naphthalene diisocyanate, 3,3'-dimethyl-4,4'-biphenyl diisocyanate, 4,4'-diisocyanatodicyclohexylmethane, or 2,4-toluene diisocyanate, or mixtures thereof.

19. The rigid thermoplastic polyurethane of claim 18 wherein the diisocyanate comprises 4,4'-diisocyanatodiphenylmethane.

* * * * *

UNITED STATES PATENT AND TRADEMARK OFFICE
CERTIFICATE OF CORRECTION

PATENT NO. : 5,627,254
DATED : May 6, 1997
INVENTOR(S) : Steven R. Oriani

It is certified that error appears in the above-identified patent and that said Letters Patent is hereby corrected as shown below:

On title page, item [54] and col. 1, line 2, "PLYURETHANE" should read --POLYURETHANE--

Claim 11, column 6, line 47, "did" should correctly read - - diol - -

Signed and Sealed this

Sixth Day of October, 1998

Attest:

BRUCE LEHMAN

Attesting Officer          Commissioner of Patents and Trademarks